United States Patent
Angerer et al.

(10) Patent No.: US 10,112,816 B2
(45) Date of Patent: Oct. 30, 2018

(54) METHOD FOR FILLING A CONTAINER WITH A FILL PRODUCT USING A PROPORTIONAL VALVE

(71) Applicant: KRONES AG, Neutraubling (DE)

(72) Inventors: Florian Angerer, Neutraubling (DE); Josef Doblinger, Neutraubling (DE)

(73) Assignee: KRONES AG, Neutraubling (DE)

( * ) Notice: Subject to any disclaimer, the term of this patent is extended or adjusted under 35 U.S.C. 154(b) by 322 days.

(21) Appl. No.: 14/801,691

(22) Filed: Jul. 16, 2015

(65) Prior Publication Data

US 2016/0016773 A1    Jan. 21, 2016

(30) Foreign Application Priority Data

Jul. 18, 2014    (DE) .................. 10 2014 110 161

(51) Int. Cl.
| | | |
|---|---|---|
| B65B 1/04 | (2006.01) | |
| B67C 3/00 | (2006.01) | |
| G05D 7/06 | (2006.01) | |

(52) U.S. Cl.
CPC .......... *B67C 3/007* (2013.01); *G05D 7/0635* (2013.01)

(58) Field of Classification Search
CPC ................. B67C 3/007; G05D 7/0635
See application file for complete search history.

(56) References Cited

FOREIGN PATENT DOCUMENTS

| | | |
|---|---|---|
| CN | 88103592 | 11/1988 |
| CN | 88103315 | 12/1988 |
| CN | 1044978 | 8/1990 |
| CN | 1931704 | 3/2007 |
| CN | 101014917 | 8/2007 |
| DE | 2559323 | 7/1977 |
| DE | 19647446 | 5/1998 |
| DE | 10301844 A1 | 8/2004 |
| JP | 3373269 | 2/2003 |
| WO | WO 98/49089 | 11/1998 |
| WO | WO 2014/206774 | 12/2014 |

OTHER PUBLICATIONS

Chinese Office Action, Chinese Patent Application No. 201510424307.9, dated Jan. 4, 2017, 10 pages.
German Search Report dated Mar. 12, 2015 from corresponding priority German application DE 10 2014 110 161.8.
European Patent Application No. 15177264.7, Extended European Search Report, 8 pages, dated Jan. 26, 2016.
Office Action issued in related Chinese Patent Application No. 201510424307.9 dated Jan. 19, 2018.

*Primary Examiner* — Jason K Niesz
(74) *Attorney, Agent, or Firm* — Haynes and Boone, LLP (57) ABSTRACT

Methods for filling a container with a fill product using a proportional valve are described. The method includes determining a function of the volume flow ($q(t)$) for a specified opening curve ($H(t)$) of the proportional valve or a specified required volume flow, and controlling the filling of the container based on the function of the volume flow ($q(t)$).

20 Claims, 4 Drawing Sheets

METHOD FOR FILLING A CONTAINER WITH A FILL PRODUCT USING A PROPORTIONAL VALVE

CROSS REFERENCE TO RELATED APPLICATIONS

This application claims priority from German Patent Application No. DE 10 2014 110 161.8, filed on Jul. 18, 2014 in the German Patent and Trademark Office, the disclosure of which is incorporated herein by reference in its entirety.

BACKGROUND

Technical Field

The present invention relates to a method for filling a container with a fill product using a proportional valve, and in particular to filling a container with a beverage.

Related Art

In order to fill containers with fill products in beverage filling plants, various possibilities are known for determining the volume flow of the fill product into the container that is to be filled, in order to specify the end of the filling process or the switch-off time point.

For example, it is known to measure the weight of the container by means of a weighing cell, and to determine the volume flowing into the container by means of the change in weight that occurs in the container during the filling process, in order in this manner to specify a switch-off time point.

It is further known to determine the volume of fill product flowing into the container by means of a volume flow meter, for example an inductive volume flow meter. This volume flow meter is typically disposed above the filler valve, and measures the volume flowing into the container during the filling process. Accordingly, the filling process can be ended when a predetermined fill volume is reached.

The known methods for ending the filling process are accordingly control methods, in which a measuring element is provided, for example a flow meter or a weighing cell, by means of which the filling process is controlled.

Filler valves, as well as the fill product flowing through the filler valves, have a certain intrinsic inertia, with the result that when the command to close is issued at the end of the filling process, the flow of fill product does not cease immediately, but only after a certain lag. In order to enable a container to be filled with exactly a specified fill volume, it is necessary to determine this lag and correspondingly advance the time of issue of the command to close, such that the correct fill volume is achieved in the container with the lag taken into account.

For this purpose it is known to use the measuring element also to measure the lag after the filler valve is switched off, for example using the weighing cell or the volume flow sensor, and then to advance the switch-off time point of the filling process correspondingly on the basis of the knowledge of the lag volume. This is therefore a control process in which a measuring element is provided for determining the lag volume, and in which the switch-off time point, at which the filler valve is closed, is corrected to take account of this lag volume.

In order to be able to control in a stepless manner the fill volume flowing into the container, and thereby to be able to trace volume flow curves that are optimized according to the fill product, filler valves are known that are designed as proportional valves, and which thus enable a substantially stepless control of the volume flow. Such a proportional valve is usually driven by a stepper motor, such that it can reach a desired open position in a reliable and reproducible manner. Due to the fact that the proportional valve is driven by the stepper motor, however, the closing process towards the end of the filling process is significantly longer than in the case of a conventional switching valve. The closure times that can be achieved are longer by a factor of approximately five. Correspondingly, the lag volume which flows through the proportional valve from the time the command is given until the proportional valve is fully closed is significantly greater than with a conventional switching valve.

It is also known when such a proportional valve is used to determine the lag volume during every filling process, for example by means of a volume flow sensor or a weighing cell, and correspondingly to determine the optimized switch-off time point by means of a control process. The volume flow during the lag varies, however, according to both the viscosity of the fill product and the differential pressure, i.e., according to the fill level of the fill product in the supply vessel, with the result that the control process must be repeated for every filling process, and the outcomes of the filling process vary according to the speed of the control process.

SUMMARY

A method for filling a container with a fill product using a proportional valve that has a simpler design is provided.

Accordingly, a method for filling a container with a fill product using a proportional valve is described, including the steps of determining a function of the volume flow $q(t)$ for a specified opening curve $H(t)$ of the proportional valve, and controlling the filling of the container based on the function of the volume flow $q(t)$.

By determining the function of the volume flow for the opening curve of the proportional valve, the filling process can be controlled based on the volume flow that was determined. Thus the elaborate control process that is known from the state of the art no longer takes place, and it is possible to dispense with the corresponding measuring elements, for example the volume flow sensor or the weighing cell.

From the function that is determined, it is thus possible to calculate the volume flowing through the proportional valve for any open position of the proportional valve. By means of the calculated volume flow curve, which gives the actual volume flow of the fill product that is flowing into the container, it is accordingly possible to control the filling process, and in particular also to determine the switch-off time point.

A method for filling a container with a fill product using a proportional valve is further described, including the steps of determining a function of the volume flow $q(t)$ for a specified opening curve $H(t)$ of the proportional valve, calculating a calculated actual volume flow $q_{actual-calculated}$ based on the determined function of the volume flow $q(t)$ for an actual open position. $H_{actual}$ of the proportional valve, and controlling the filling of the container with a required volume flow curve $q_{req}(t)$ as reference variable and the calculated actual volume flow $q_{actual-calculated}$ as controlled variable.

In this manner the calculation of the calculated actual volume flow takes over the function of a measuring element, which would usually measure the actual volume flow and pass this as the controlled variable for comparison with the reference variable that is specified by means of the required volume flow. Accordingly, the measuring element can also be dispensed with in a control process, and in this manner a technically simpler and more reliable design can be provided.

In one embodiment, in order to determine the function of the volume flow q(t), a function Kv(H) of the flow factor Kv of the proportional valve for every open position H of the proportional valve is determined and the volume flow $q_\infty(t)$ in the steady state is determined by:

$$q_\infty(H) = K_v(H) * \sqrt{\frac{\Delta p}{1000 \text{ mbar}} * \frac{1000 \text{ kg/m}^3}{\delta}}$$

wherein $\Delta p$ is the differential pressure and $\delta$ is the density of the medium flowing through the proportional valve.

In certain embodiments, the function of the flow factor Kv(H) of the proportional valve for every open position H is determined by prior measurement of the flow factor Kv at discrete open positions H and determination of a function of the flow factor Kv(H) from the discrete values, and in some embodiments, by the determination of a smoothing function. In several embodiments, the function of the flow factor Kv(H) is fitted to the discrete values by means of a regression analysis, the least squares method, the determination of a fit, or the determination of a polynomial equation, and in one embodiment, a polynomial equation of the sixth order.

In some embodiments, in order to measure the flow factor Kv at an open position H, the volume flow q, the differential pressure $\Delta p$ and the density $\delta$ of the medium flowing through the proportional valve are determined and the flow factor is calculated as follows:

$$K_v = q_\infty * \sqrt{\frac{1000 \text{ mbar}}{\Delta p} * \frac{\delta}{1000 \text{ kg/m}^3}}$$

In the method specified above, the differential pressure $\Delta p$ is, for example, determined by means of pressure sensors in the base of the supply vessel and addition of the static height to the valve outlet, by means of level sensors in the supply vessel and addition of the static height to the valve outlet, and/or by means of pressure sensors disposed directly at the outlet of the filling element.

In the calculation of the volume flow for a specified opening curve of the proportional valve, it is additionally taken into account that when the open position is changed dynamically, i.e., in the case of opening, closing or adjustment of the volume flow of the proportional valve, the volume flowing through the proportional valve in each case does not exactly correspond to the volume flow that would have been established after an extended period in which the open position of the proportional valve had remained constant. Instead, there exists in this case a dynamic volume flow, which can be determined by means of the calculation of the volume flow for the specified opening curve of the proportional valve.

The volume flow q(t) for a specified opening curve H(t) of the proportional valve is, in certain embodiments, determined by the solution of a mechanical mesh equation, and may be solved for downward sloping open positions H(t) by $$q(t) = q_\infty + (q_0 - q_\infty) * e^{-\frac{\Delta t}{\tau}}$$

where $\tau = K_v(H) * m$ where $$q_\infty = K_v * \sqrt{\frac{\Delta p}{1000 \text{ mbar}} * \frac{1000 \text{ kg/m}^3}{\delta}}$$

where $q_0$=volume flow at the beginning of the settling process, and where m=constant and for upward sloping open positions H(t) by $$q(t) = q_0 + (q_\infty - q_0) * \left(1 - e^{-\frac{\Delta t}{\tau}}\right)$$

where $\tau = K_v(H) * m$ where $$q_\infty = K_v * \sqrt{\frac{\Delta p}{1000 \text{ mbar}} * \frac{1000 \text{ kg/m}^3}{\delta}}$$

where $q_0$=volume flow at the beginning of the settling process, and where m=constant.

Thus the applicable volume flow curve of the fill product flowing into the container can be determined not only for a static open position, but also for any dynamic opening curve of the proportional valve, with the result that this volume flow curve can be utilized to control the filling process.

In particular, it is possible in this manner to determine a switch-off time point for the proportional valve. For this purpose, the closing curve H(t) of the proportional valve is first determined for the switching off process. In this closing curve, three movement segments usually occur, which the stepper motor has to pass through in sequence. These are, first, acceleration at a specified rate until a specified constant speed is reached, then closure of the valve at the constant speed, and then, as the third movement phase, braking at a specified negative acceleration until zero speed is reached when the valve is fully closed. This movement pattern is also carried out by the stepper motor when the proportional valve is opened, and each time its open position changes. In all cases, first an acceleration from the valve's stationary position to a specified constant speed is carried out, followed by braking until the valve is again stationary at the predetermined position. This process results in the corresponding opening curves H(t).

The opening curve H(t) or closing curve H(t) that is thereby specified is now used to calculate the lag volume. Accordingly the volume flow that occurs is calculated for the specified closing curve, and from this, for example by means of integration, the lag volume that continues to flow into the container while the closing curve is traversed is calculated. On this basis the filling process can be controlled such that the command to traverse the closing curve is given at a closing time point that has been determined in this manner. By this means, the desired fill volume is achieved during the first filling process, without the need for additional control steps.

The determination of the volume flow curve q(t) for the specified opening curve of the proportional valve also serves to determine the total fill volume of fill product that is introduced using the proportional valve into the container that is to be filled. In this manner, after calculation of the integrated or summed fill volume over the specified opening curve, it is also possible to determine the switch-off time point correctly, and in particular to specify the point in time at which the closing curve is traversed.

Accordingly, after the determination of the function of the volume flow q(t) all subsequent filling processes are, in several embodiments, controlled by means of this function, or the function of the volume flow q(t) is newly calculated for each new filling process on the basis of the function of the flow factor Kv(H).

In some embodiments, for a specified closing curve H(t) to end the filling process the volume flow q(t) is calculated, and, by integration over the volume flow, the lag volume is calculated, and the lag volume is taken into account when determining the time point at which the closing curve is traversed.

The lag volume is thereby, in some embodiments, calculated for every filling process shortly before the estimated end of filling, in order to be able to determine as accurately as possible the applicable surrounding conditions, in particular the volume flow, the differential pressure and the density.

In several embodiments, the total fill volume of the fill product is determined by integration of the function of the volume flow q(t) over the course of the filling process, and the end of filling is determined on this basis.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
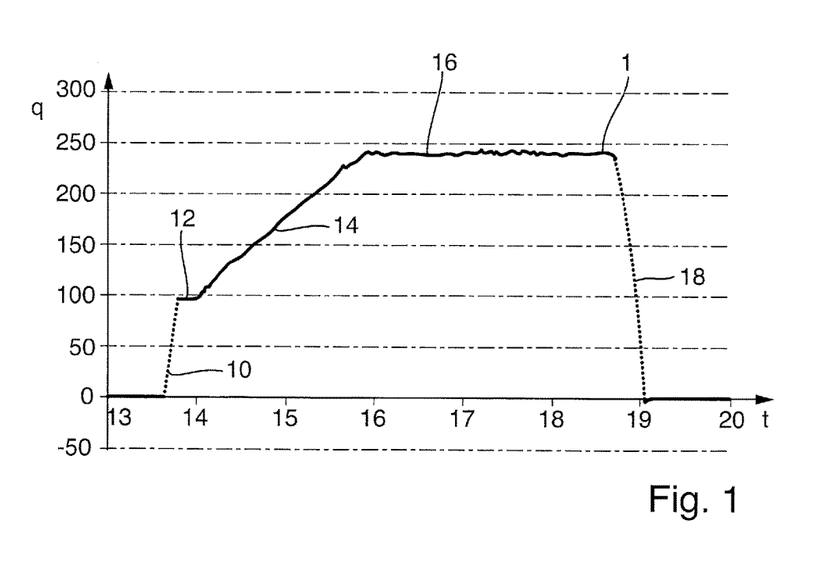
FIG. 1 is a schematic representation of a measured volume flow curve q(t)

FIG. 1 shows the curve of a measured volume flow q(t) during a filling process over time t. The volume flow q(t) is the volume of the fluid flowing through the proportional valve per unit time, and is here indicated in the units ml/sec.

Such a curve of the measured volume flow 1 results, for example, when a proportional valve is controlled with a specified opening curve, and accordingly differing open positions or ramp functions of the open position of the proportional valve are traversed during the filling process. The curve of the measured volume flow 1 that is shown in FIG. 1 was determined for a particular proportional valve by means of a flow meter, and is thus the result of the open position curve H(t) traversed by the proportional valve, resulting in a volume flow curve of q(H(t)).

It can be seen in this example that an opening process 10 traverses a short plateau region 12 followed by an opening ramp 14. The main filling is then carried out in a plateau region 16 of high volume flow, after which a closing curve 18 is traversed. The example shown here is to be understood as an example only. It shows, however, a common behavior of the volume flow 1 when beverages are filled and the aim is to achieve as gentle a filling process as possible, with a low tendency to foaming and exactly the desired fill volume.

It can also be recognized from the measured curve of the volume flow 1 that there is no sudden increase in the volume flow during the opening process 10, or sudden cessation of the volume flow when the closing curve 18 is traversed. Instead, the applicable curves have a finite gradient or a complex shape. This is because, first, a proportional valve needs a finite time for the opening and closing process, and secondly that the medium flowing through has a certain inertia, which prevents the medium from responding immediately to the open position of the proportional valve.

The determination of the curve of the volume flow 1 by means of a specified opening curve of the proportional valve, which is described below, enables a volume flow curve 1 also to be determined without actual measurement of the volume flow. Instead, the volume flow curve 1 can be calculated or simulated by means of the Kv model that is described below. Accordingly, it is possible in normal filling operation to dispense with the measuring element in the form of a flow meter or a weighing cell that was described above, with the result that a filling device that is controlled in this manner can be designed in a simpler, more cost-efficient and more reliable manner.

In order to enable the determination of the volume flow curve q(H(t)) from the opening position curve H(t) of the proportional valve, so that in actual filling operation it is possible to dispense with the use of a control system and in particular a measuring element, the following method is described.

First a function of the flow factor Kv(H) of the proportional valve for every open position H of the proportional valve is determined. The flow factor Kv is also known as the flow coefficient. It is a measure of the attainable flow rate of a fluid or a gas through a proportional valve. It is here stated in the units ml/sec and can be interpreted as the effective cross-section. Each Kv value applies only to the associated open position H of the proportional valve.

In order to determine the flow factor Kv, in an initial calibration process the proportional valve is controlled to adopt a specific open position $H_i$, the fill product flow q(H) from the proportional valve is measured at this open position $H_i$, and from this the flow factor Kv is determined in the steady state, for example by means of measurement using a measuring cell such as a weighing cell. This process is carried out for a multiplicity of discrete open positions $H_i$ of the proportional valve.

The following relationship is obtained between the Kv value and the volume flow $q_\infty$ (volume flow in the steady state):

$$q_\infty = K_v * \sqrt{\frac{\Delta p}{1000 \text{ mbar}} * \frac{1000 \text{ kg/m}^3}{\delta}} \quad (1)$$

where $\Delta p$ is the differential pressure between the valve outlet and the static level of the fill product;

where $\delta$ is the density of the fill product.

Thus for the exact determination of the flow factor Kv, it is also necessary, besides the above-mentioned measurement of the volume flow at a specific open position, to determine the differential pressure $\Delta p$ and the density $\delta$ of the medium flowing through the proportional valve.

The differential pressure $\Delta p$ between the valve outlet and the static level varies with the static level of the fill product, which can be accommodated for example in a supply vessel. In a beverage filling plant, for example, the following alternatives exist for determining the differential pressure.

The total pressure difference can be determined by means of pressure sensors in the base of the supply vessel and addition of the static height to the valve outlet.

The total fluid column bearing on the valve outlet can be determined by means of level sensors in the supply vessel and addition of the static height to the valve outlet. From this, the total pressure difference can be determined. This method of determining the total pressure difference may, however, have the disadvantage that it may not be possible to take account optimally of, for example, waves in the fill product in the vessel, and centrifugal effects brought about by differing filling rates.

The differential pressure can be determined exactly by means of pressure sensors disposed directly at the outlet of the filling element. However, the pressure sensor may influence the flow behavior of the fill product at the filler valve outlet, and hence the filling process itself.

The density $\delta$ of the fill product is usually known, or can be determined by known measurement methods. For water the density can be assumed to be approximately 1000 kg/m$^3$, and then has no influence on the calculation.

Accordingly, from the volume flow q measured for a specific open position $H_i$, the specific differential pressure $\Delta p$ and the specific $\delta$, the Kv value for this open position can now be determined by:

$$K_v(H_i) = q_\infty * \sqrt{\frac{1000 \text{ mbar}}{\Delta p} * \frac{\delta}{1000 \text{ kg/m}^3}} \quad (2)$$

In order here to determine a function of the flow factor Kv(H) over the open positions $H_i$, after the determination of all flow factors $Kv(H_i)$, a function of the flow factor over the open positions of the proportional valve is determined by means of the determination of a best-fit curve through the each of the flow factors $Kv(H_i)$. The best-fit curve can be determined for example by linear regression, the least squares method, a fit algorithm, or another known method for determining a best-fit curve through measured values. This determination and calculation is carried out for various discrete values of the open position $H_i$.

Figure 2:
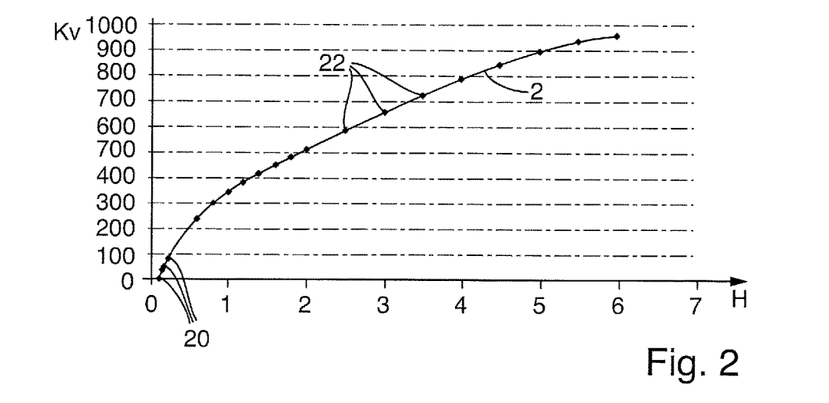
FIG. 2 is a schematic representation of a curve of the flow factor Kv over the lift H of a proportional valve.

As the best-fit curve, a polynomial of the sixth order can for example be used, as shown for example in FIG. 2, in which the flow factor is plotted over the corresponding open positions of the proportional valve. In FIG. 2, in order to determine the best-fit curve, a first range of values from 0 to 2 mm and a second range of values from 2 mm to 6 mm were used. In this case, in order to form the curve of the Kv values 2 over the open position H of the proportional valve, the discrete values 20 in the first range of values and the discrete values 22 in the second range of values were used, to form a best-fit curve using a sixth-order polynomial.

For a certain lift H of the proportional valve the resulting best-fit curve of the flow factor Kv is for example:

$$Kv(H) = c_6*H^6 + c_5*H^5 + c_4*H^4 + c_3*H^3 + c_2*H^2 + c_i*H + c_7 \quad (3)$$

where $c_1$ to $c_7$ are the respective coefficients for adjusting the function to the measured values.

By means of the determination of the best-fit function, all intervening values of the open positions can then be taken into account in the filling process. The corresponding volume flow can thereby be calculated for steady states for every open position:

$$q_\infty(H) = K_v(H) * \sqrt{\frac{\Delta p}{1000 \text{ mbar}} * \frac{1000 \text{ kg/m}^3}{\delta}} \quad (4)$$

In this, however, it must be taken into account that this function of the flow factor Kv(H) of the proportional valve for each open position relates to the corresponding volume flow in the steady state, i.e., after an extended period in which the open position of the proportional valve has remained constant. When the proportional valve opens, closes or travels from one open position to another, however, other dynamic influences become important.

In order to address the dynamic influences, an analogy from the field of electrical engineering will first be used. In the table below certain electro-mechanical analogies are drawn:

| Electrical equivalent | Mechanical equivalent |
|---|---|
| ohmic resistance | Kv value |
| voltage | differential pressure |
| current | volume flow |
| inductance | accelerated mass |

Figure 3:
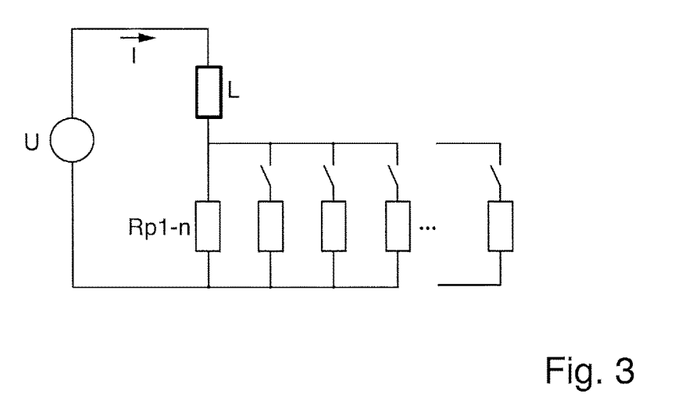
FIG. 3 is a schematic representation of an electrical equivalent circuit diagram.

FIG. 3 shows schematically an equivalent circuit diagram of an electrical model for a proportional valve. In this, the resistors Rp1-$n$ represent a pre-selectable resistance, which corresponds to the flow factor Kv, and which, in accordance with the character of the proportional valve, can be varied by means of the opening or closing of the applicable switches of the resistors, which are connected in parallel.

The power source, which provides a voltage U, thus represents the differential pressure which provides a corresponding pressure for the fluid. The current I corresponds to the volume flow, and the inductance L the accelerated mass.

The dynamic behavior of this electrical circuit can be represented by means of a mesh equation, which involves an inhomogeneous differential equation of the first order:

$$u(t) = Rp * i(t) + L * \frac{di(t)}{dt} \quad (5)$$

This inhomogeneous differential equation of the first order is satisfied by the following solution for increasing resistance values, i.e., continually added Rp1-n:

$$i(t) = i_\infty + (i_0 - i_\infty) * e^{-\frac{t}{\tau}}$$

where $$\tau = \frac{L}{R_p}$$

where $$i_\infty = \frac{U}{R_p}$$

where $i_0$=current at the beginning of the settling process.

It should however be noted that this settling process is constantly interrupted and replaced by a new settling process due to continually changing Rp.

A similar solution of the mesh equation can be found for decreasing resistance values, i.e., continually deactivated Rp1-n:

$$i(t) = i_0 + (i_\infty - i_0) * \left(1 - e^{-\frac{t}{\tau}}\right)$$

where $$\tau = \frac{L}{R_p}$$

where $$i_\infty = \frac{U}{R_p}$$

where $i_0$=current at the beginning of the settling process.

It should however be noted that this settling process too is constantly interrupted and replaced by a new settling process due to continually changing Rp.

The electrical picture can be transferred to the mechanical equivalent, resulting in the following interrelationships for decreasing lifts H (corresponding to increasing resistance values):

$$q(t) = q_\infty + (q_0 - q_\infty) * e^{-\frac{\Delta t}{\tau}}$$

where $$\tau = K_v(H) * m$$

where $$q_\infty = K_v(H) * \sqrt{\frac{\Delta p}{1000 \text{ mbar}} * \frac{1000 \text{ kg/m}^3}{\delta}}$$

where $q_0$=volume flow at the beginning of the settling process where m=constant.

The following interrelationships result for increasing lifts H (corresponding to decreasing resistance values):

$$q(t) = q_0 + (q_\infty - q_0) * \left(1 - e^{-\frac{\Delta t}{\tau}}\right)$$

where $$\tau = K_v(H) * m$$

where $$q_\infty = K_v(H) * \sqrt{\frac{\Delta p}{1000 \text{ mbar}} * \frac{1000 \text{ kg/m}^3}{\delta}}$$

where $q_0$=volume flow at the beginning of the settling process where m=constant.

These formulae are valid in each case for a defined incremental change in the open position. If the open position changes again during the settling process, the settling process is replaced by a new settling process with new parameters.

Figure 4:
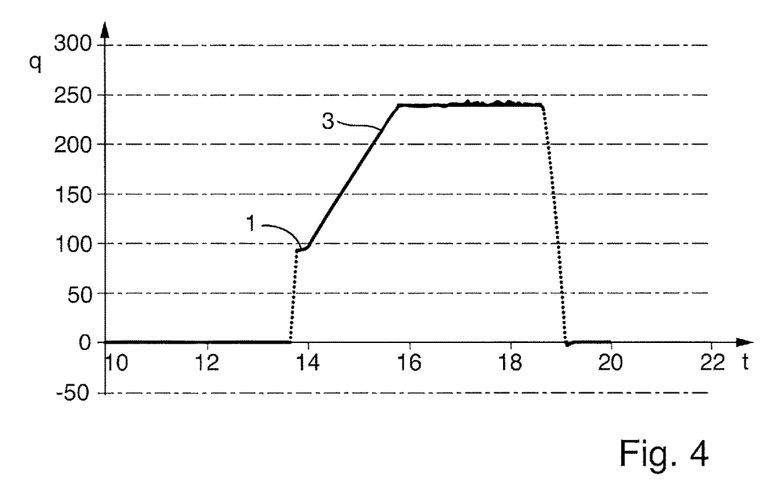
FIG. 4 is a schematic representation of the comparison between a measured and a calculated volume flow curve q(t)

For the curve of the volume flow 1 that is shown in FIG. 1, the entire course of the volume flow 1 is now represented as a simulated volume flow 3, which can be seen in FIG. 4, using the underlying opening curve of the proportional valve with the formulae described above, and on the basis of the measured flow factors.

Here it can immediately be seen that the measured volume flow 1 is substantially identical to the simulated volume flow 3. Accordingly, when the differential pressure, the density of the fill product and the flow factor are known, the simulated volume flow 3 can replace the continual measurement of the volume flow 1 during the filling operation.

Thus if the described method is used, it is possible to dispense with a measuring element for controlling the filling process on the basis of the measured volume flow. Instead, after the calculation of the simulated volume flow 3, the proportional valve can be controlled directly in a simple manner to adopt a particular opening curve, and the desired fill volume can be reached. Thus a valve controller can be used in place of the control system.

In order to determine the fill volume that is introduced into the container that is to be filled, the simulated volume flow curve 3 is then integrated.

At this point a special situation at the end of the filling process is additionally considered. As already discussed above, the closing curve of a proportional valve is relatively prolonged, and the closing process can last as long as 500 milliseconds. For this reason, as well as the relative inertia of the volume flow, the volume flow is only slowly switched off, which results in a lag that must be taken into account in the calculation of the total fill volume.

Figure 5:
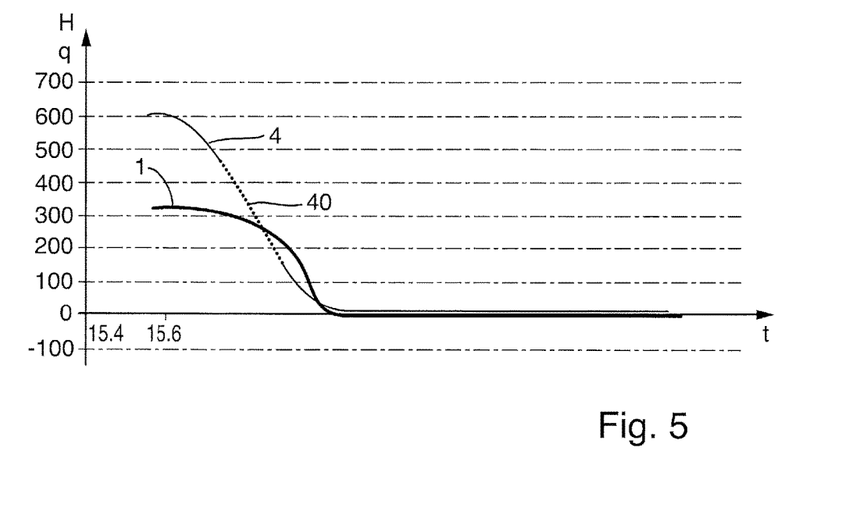
FIG. 5 is a schematic representation of a closing curve H(t) of a proportional valve and the measured volume flow q(t)

In this context, FIG. 5 shows a curve of the open positions 4 of the proportional valve in the region of a specified closing curve 40 over time t. It can be seen from this that the values $H_i$ of the open positions 4 in the example embodiment that is shown are discrete, because the proportional valve is driven by a stepper motor.

FIG. 5 shows at the same time a curve of the measured volume flow 1, such as results during the closure of the proportional valve.

On the basis of the method described above for determining the simulated volume flow for a specified opening curve, the volume flow can also be calculated by similar means for the specified closing curve 40, i.e., a curve of the open positions H(t) of the proportional valve as it closes. By integration of the volume flow over the entire closing curve, the total lag volume thus can be determined.

Figure 6:
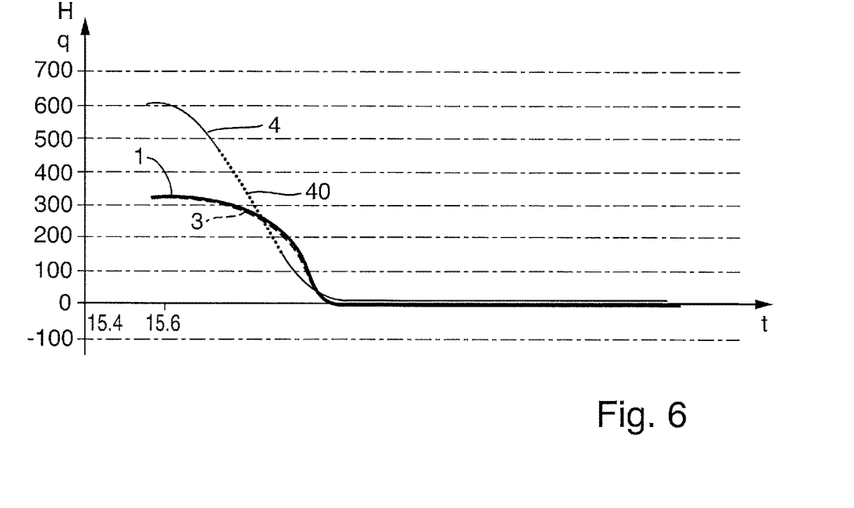
FIG. 6 is a schematic representation of a closing curve H(t) with a calculated and a measured volume flow curve q(t)

In FIG. 6, the volume flow 3 that is simulated by means of the method described above is again represented. It is clear that here again the simulation of the volume flow 3 of the lag over the specified closing curve accords with the measured curve of the volume flow 1. Accordingly, by means of a prior calculation of the lag volume flow, the precise switch-off time point, or the time point for beginning to traverse the switching-off curve, can be correctly determined in this manner, such that it is possible to dispense with a measuring element, for example a weighing cell or a flow meter, for controlling the filling process. It is thus possible to dispense in this case with a control system and instead use a valve controller.

Figure 7:
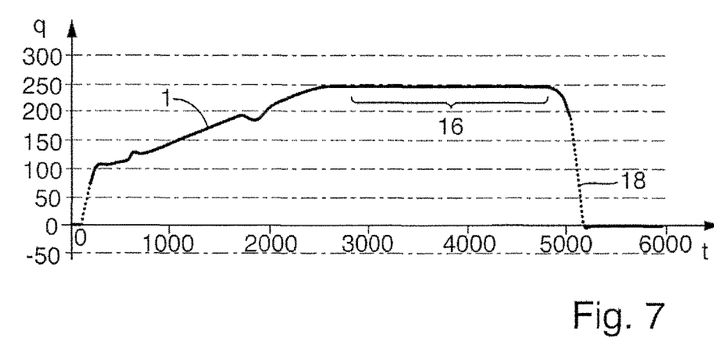
FIG. 7 is a schematic representation of a measured volume flow curve q(t) in an alternative example embodiment.

In a variant shown in FIG. 7, the method can also be used in systems in which each proportional valve has its own measuring element, for example a flow meter or a weighing cell. By this means, with a static level 16 of the measured volume flow q, the precise flow factor Kv of the proportional valve at this volume flow can be determined, and from this the volume flow as the closing curve 18 is traversed can be determined. The switch-off time point, i.e., the time point for beginning to traverse the switching-off curve, can thereby be precisely determined.

The calculation is performed as near to the expected switch-off time point as possible, in order to carry out the calculation of the lag volume in conditions that are as close as possible to those which actually obtain during the lag, for example as regards the fluid level in the supply vessel, the corresponding pressure in the vessel, or the product temperature, which in turn affects the viscosity of the fill product.

In order to calculate the lag, the sequence of steps listed below is carried out. The calculation, in various embodiments, takes place at the point in time at which the proportional valve has reached the maximum volume flow, and enough time still remains before the end of the filling process:

(1) Determination of the duration of the movement, from the acceleration of the motor and the maximum motor speed, in order to determine the closing curve H(t);

(2) Determination of the prevailing static level in the region of the plateau 16 from:

Kv(H) and the current volume flow q; and

The static level is needed during the calculation, for the continual calculation of $q_\infty$;

(3) Simulated (calculated) incremental lowering of the open position H in accordance with the movement profile as a function of the time t;

(4) Calculation of Kv(H) at the new open position;

(5) Calculation of $q_\infty$ and $\tau$ with Kv(H);

(6) Calculation of q(t)

(7) →Go to step 3, or end the calculation if the duration of movement t has expired.

By means of the calculation of the lag, it is possible to achieve greater accuracy in the case of fluctuations in the level of the fill product in the vessel, fluctuations in the pressure in the vessel, and fluctuations in temperature. It is thereby also possible to achieve optimum filling of the first container, and dispense with control of the lag using a measuring element.

Figure 8:
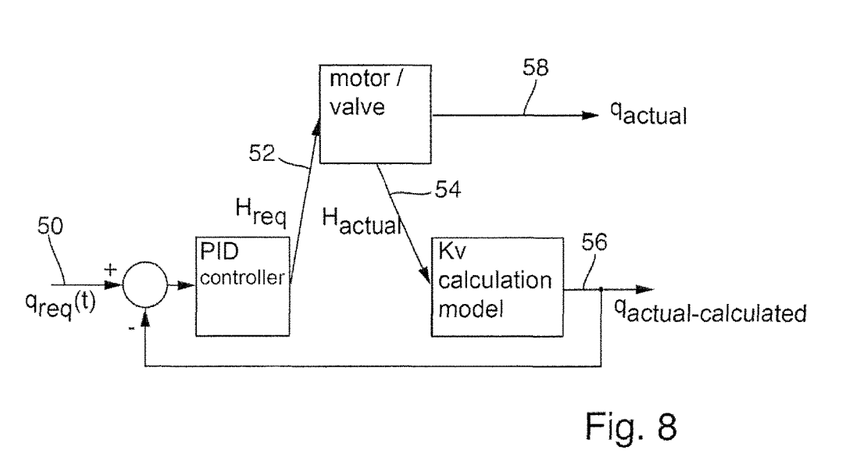
FIG. 8 is a schematic representation of a control system, which carries out a control of the proportional valve based on a required volume flow curve.

FIG. 8 shows a control system which makes use of the calculated volume flow q(t) that is determined via the Kv model for a given open position H of the proportional valve, wherein, in this example embodiment too, the Kv model replaces a measuring element.

A required volume flow 50 is supplied as reference variable to the control system, which is embodied for example as a PID controller. The required volume flow 50 can also be a required volume flow curve $q_{req}(t)$, i.e., a volume flow which can vary over time, which is required to flow into a container that is to be filled.

On this basis therefore, by means of the PID controller a required open position $H_{req}$ is determined, and passed as the required open position 52 to the actuator of the proportional valve. On the basis of this control command the proportional valve opens, and passes its actual open position $H_{actual}$ as the actual open position 54 to the Kv calculation model as the open position. Due to the inertia of the proportional valve, the actual open position 54 and the required open position 52 can diverge.

Based on the actual open position $H_{actual}$, the Kv model calculates a calculated actual volume flow $q_{actual-calculated}$ as the calculated actual volume flow 56, which is again supplied to the control system as the controlled variable, and compared with the reference variable of the required volume flow $q_{req}$. Thus the controlled variable $q_{actual-calculated}$ is calculated based on the actual open position $H_{actual}$, and is then used to control the required open position $H_{req}$. In contrast to conventional control, it is possible in this manner to dispense with a measuring element for determining the controlled variable, i.e., the actual volume flow. The measuring element is instead replaced by the Kv model.

As discussed and demonstrated above, by means of the Kv model the actual volume flow can be determined with good accuracy for a specific open position. The calculated actual volume flow $q_{actual-calculated}$ thus substantially corresponds to the actual volume flow $q_{actual}$ that is actually flowing through the proportional valve, which could be measured as the actual volume flow 58.

To the extent applicable, all individual features described in the individual example embodiments can be combined with each other and/or exchanged, without departing from the field of the invention.

The invention claimed is:

1. A method for filling a container with a fill product, comprising:

determining a volume of fluid flowing through a proportional valve per unit time for each of a plurality of open positions of the proportional valve for a specified opening curve (H(t)) of the proportional valve to generate a curve of volume of the fluid flowing through the proportional valve as a function of time; and controlling the filling of the container based on the curve.

2. The method of claim 1, wherein determining the volume of fluid flowing through the proportional valve per unit time comprises determining a function (Kv(H)) of a flow factor (Kv) of the proportional valve for a plurality of open positions (H) of the proportional valve and a volume flow ($q_\infty$(H)) in a steady state.

3. The method of claim 2, further comprising controlling subsequent filling processes using the determined volume of fluid flowing through the proportional valve per unit time or calculating a new volume flow as a function of time (q(t)) for a new filling process on the basis of the function (Kv(H)) of the flow factor.

4. The method of claim 2, wherein the volume flow ($q_\infty$(H)) in the steady state is determined by:

$$q_\infty(H) = K_v(H) * \sqrt{\frac{\Delta p}{1000 \text{ mbar}} * \frac{1000 \text{ kg/m}^3}{\delta}}$$

wherein $\Delta p$ is a differential pressure and $\delta$ is a density of a medium flowing through the proportional valve.

5. The method of claim 2, wherein determining a function (Kv(H)) of the flow factor (Kv) of the proportional valve for the plurality of open positions (H) comprises measuring the flow factor (Kv) at discrete open positions H and determining a function of the flow factor (Kv(H)) from discrete flow factor values.

6. The method of claim 5, further comprising fitting the function (Kv(H)) of the flow factor to the discrete flow factor values using regression analysis, the least squares method, a fit algorithm, or determination of a polynomial equation.

7. The method of claim 6, wherein the polynomial equation is of the sixth order.

8. The method of claim 5, wherein measuring the flow factor (Kv) at an open position (H) of the volume flow (q) comprises determining a differential pressure ($\Delta p$) and a density ($\delta$) of a medium flowing through the proportional valve.

9. The method of claim 8, further comprising calculating the flow factor (Kv) by:

$$K_v = q_\infty * \sqrt{\frac{1000 \text{ mbar}}{\Delta p} * \frac{\delta}{1000 \text{ kg/m}^3}}$$

10. The method of claim 8, wherein the differential pressure ($\Delta p$) is determined using one or more of pressure sensors in a base of a supply vessel and addition of a static height to a valve outlet, level sensors in the supply vessel and addition of the static height to the valve outlet, and pressure sensors disposed at an outlet of a filling element.

11. The method of claim 1, wherein the curve is determined by a solution of a mechanical mesh equation.

12. The method of claim 11, wherein the solution of the mechanical mesh equation is solved for downward sloping open positions by $$q(t) = q_\infty + (q_0 - q_\infty) * e^{-\frac{\Delta t}{\tau}}$$

where $$\tau = K_v(H) * m$$

where $$q_\infty = K_v(H) * \sqrt{\frac{\Delta p}{1000 \text{ mbar}} * \frac{1000 \text{ kg/m}^3}{\delta}}$$

where $q_0$=volume flow at a beginning of a settling process, and
where m=constant
and for upward sloping open positions by $$q(t) = q_0 + (q_\infty - q_0) * \left(1 - e^{-\frac{\Delta t}{\tau}}\right)$$

where $$\tau = K_v(H) * m$$

where $$q_\infty = K_v(H) * \sqrt{\frac{\Delta p}{1000 \text{ mbar}} * \frac{1000 \text{ kg/m}^3}{\delta}}$$

where $q_0$=volume flow at the beginning of the settling process, and
where m=constant.

13. The method of claim 1, further comprising calculating a volume of fluid flowing through the proportional valve per unit time for a specified closing curve to end a filling process, calculating a lag volume by integration over the volume of fluid flowing through the proportional valve per unit time, and taking the lag volume into account when determining a time point at which the closing curve is traversed.

14. The method of claim 13, wherein the lag volume is calculated for a plurality of filling processes before an estimated end of filling.

15. The method of claim 1, further comprising determining a total fill volume of the fill product by integration of the curve over a course of a filling process, and determining an end of filling based on the determined total fill volume.

16. A method for filling a container with a fill product, comprising:
determining a volume flow as a function of time (q(t)) for a specified opening curve (H(t)) of a proportional valve;
calculating an actual volume flow ($q_{actual\text{-}calculated}$) based on the determined volume flow as a function of time (q(t)) for an actual open position ($H_{actual}$) of the proportional valve; and
controlling a filling of the container with a required volume flow curve ($q_{req}(t)$) as a reference variable and the calculated actual volume flow ($q_{actual\text{-}calculated}$) as a controlled variable.

17. The method of claim 16, wherein determining the volume flow as a function of time (q(t)) comprises determining a function (Kv(H)) of a flow factor (Kv) of the proportional valve for open positions (H) of the proportional valve and a volume flow ($q_\infty(H)$) in a steady state, wherein the volume flow ($q_\infty(H)$) in the steady state is determined by:

$$q_\infty(H) = K_v(H) * \sqrt{\frac{\Delta p}{1000 \text{ mbar}} * \frac{1000 \text{ kg/m}^3}{\delta}}$$

wherein $\Delta p$ is a differential pressure and $\delta$ is a density of the medium flowing through the proportional valve.

18. The method of claim 17, further comprising calculating the flow factor (Kv) by:

$$K_v = q_\infty * \sqrt{\frac{1000 \text{ mbar}}{\Delta p} * \frac{\delta}{1000 \text{ kg/m}^3}}$$

19. The method of claim 16, wherein the volume flow as a function of time (q(t)) is determined by a solution of a mechanical mesh equation, and the solution of the mechanical mesh equation is solved for downward sloping open positions by $$q(t) = q_\infty + (q_0 - q_\infty) * e^{-\frac{\Delta t}{\tau}}$$

where $$\tau = K_v(H) * m$$

where $$q_\infty = K_v(H) * \sqrt{\frac{\Delta p}{1000 \text{ mbar}} * \frac{1000 \text{ kg/m}^3}{\delta}}$$

where $q_0$=volume flow at a beginning of a settling process, and where m=constant and for upward sloping open positions by $$q(t) = q_0 + (q_\infty - q_0) * \left(1 - e^{-\frac{\Delta t}{\tau}}\right)$$

where $$\tau = K_v(H) * m$$

where $$q_\infty = K_v(H) * \sqrt{\frac{\Delta p}{1000 \text{ mbar}} * \frac{1000 \text{ kg/m}^3}{\delta}}$$

where $q_0$=volume flow at the beginning of the settling process, and where m=constant.

20. The method of claim 16, further comprising determining a total fill volume of the fill product by integration of the volume flow as a function of time (q(t)) over a course of a filling process, and determining an end of filling based on the determined total fill volume.

* * * * *